United States Patent
Nakakawaji et al.

[11] Patent Number: 5,820,964
[45] Date of Patent: Oct. 13, 1998

[54] MAGNETIC DISK, AND MAGNETIC DISK APPARATUS

[75] Inventors: Takayuki Nakakawaji, Kitaibaraki; Shuji Imazeki, Hitachi; Yutaka Ito, Takahagi; Yuko Morita, Tsuchiura; Mitsuyoshi Shouji, Juou-machi; Hisashi Morooka, Hitachi; Heigo Ishihara, Hinode-machi; Hiroyuki Matsumoto, Chigasaki; Tetsuya Hamaguchi, Chiyoda-machi; Hiroshi Sasaki, Tokai-mura; Tomoyuki Hamada, Hitachi, all of Japan

[73] Assignee: Hitachi, Ltd., Tokyo, Japan

[21] Appl. No.: 554,809

[22] Filed: Nov. 7, 1995

[30] Foreign Application Priority Data

Nov. 7, 1994 [JP] Japan .................. 6-272425
Jan. 23, 1995 [JP] Japan .................. 7-007908

[51] Int. Cl.$^6$ .................................. G11B 5/71
[52] U.S. Cl. .................. 428/65.4; 428/422; 428/447; 428/694 TP; 428/694 TF; 428/900; 427/128; 427/131; 360/97.01; 360/103; 360/135
[58] Field of Search ................. 428/422, 447, 428/694 TF, 900, 65.4, 694 TP; 427/128, 131; 360/97.01, 103, 135

[56] References Cited

U.S. PATENT DOCUMENTS

| | | |
|---|---|---|
| 4,529,659 | 7/1985 | Hoshino et al. .......... 428/422 |
| 4,797,303 | 1/1989 | Frew et al. .............. 427/131 |
| 5,037,710 | 8/1991 | Frew et al. .............. 428/695 |
| 5,049,410 | 9/1991 | Johary et al. ............ 427/131 |
| 5,082,714 | 1/1992 | Yanai et al. ............. 428/141 |
| 5,091,269 | 2/1992 | Kondo et al. ............ 428/695 |
| 5,093,211 | 3/1992 | Kudo et al. ............. 428/694 |
| 5,157,066 | 10/1992 | Shoji et al. ............. 524/220 |
| 5,178,954 | 1/1993 | Norman ................. 428/422 |
| 5,456,980 | 10/1995 | Murakami et al. ......... 428/336 |
| 5,498,457 | 3/1996 | Ishihara et al. .......... 428/65.4 |

Primary Examiner—Stevan A. Resan
Attorney, Agent, or Firm—Antonelli, Terry, Stout & Kraus, LLP

[57] ABSTRACT

The present invention is aimed at providing a magnetic disk and a magnetic disk apparatus both of which have a high performance lubricating film which makes continuous sliding endurance and low adhesiveness compatible, and a lubricating film having a self repairing function which makes it possible to recombine scratched off lubricating agent from the magnetic disk surface by sliding with a head onto the magnetic disk surface. The lubricating film comprises at least two kinds of lubricating agents each of which forms an individual layer, the layers being laminated. An adhesion enhancing layer is formed between a magnetic film and a lubricating agent at the surface of the magnetic disk, and the adhesion enhancing layer is fixed onto the magnetic film surface. Then, the adhesion enhancing layer and the lubricating agent are combined. The adhesion enhancing layer and the lubricating agent form a salt or complex body, and the lubricating agent can repeat adsorption and desorption with the adhesion enhancing layer reversely by a thermal reaction.

35 Claims, 5 Drawing Sheets

CARBOXYLIC ACID : F(CF$_2$-CF$_2$-CF$_2$-O)$_n$-CF$_2$-CF$_2$-COOH

BONDING STATE : F(CF$_2$-CF$_2$-CF$_2$-O)$_n$-CF$_2$-CF$_2$-COO$^-$ NHR$^+$

MAGNETIC DISK, AND MAGNETIC DISK APPARATUS

BACKGROUND OF THE INVENTION (1) Field of the Invention

The present invention relates to a magnetic disk for storing magnetic information, and a magnetic disk apparatus wherein the magnetic disk is assembled.

(2) Description of the Prior Art

A hard type magnetic disk apparatus is widely used as an apparatus for recording and regenerating a large amount of information. In accordance with decreasing the size of computers, reducing the diameter of the disk and the size and weight of the disk apparatus has progressed. However, reducing the size of the disk is accompanied with a requirement for high recording density in the recording capacity of the disk. Therefore, a small size magnetic disk apparatus having a large capacity will certainly be a main current of future magnetic disk apparatus.

In case of a magnetic disk apparatus mounted with a small disk in diameter, it is required to reduce an amount of head levitation, that is, an interval between the magnetic head and the magnetic disk, in order to increase recording capacity of the magnetic disk. An example of the head levitation in a current commercially available magnetic disk apparatus is as narrow as about 0.1 μm. The trend in reducing the head levitation will certainly be progressed hereafter, and the levitation region between the head and the magnetic disk in the near future will be on the order of nanometers (ultra low levitation), or zero; that means the recording and the regenerating will be performed under a completely contacting condition. Therefore, the sliding condition between the magnetic head and the magnetic disk becomes necessarily severe. Accordingly, a superior slide endurance is required for a lubricating film formed on an exterior surface of the disk hereafter, because performance of the lubricating film influences directly the sliding reliability of the magnetic disk.

In order to make lubricating agents having high performance ability and multifunctions such as improved slide endurance, a high coating ability of the lubricating agent molecules which is required for corrosion resistance of the magnetic disk, and repairing ability at the sliding portion by the magnetic head, lubricating films (mixed films) prepared by mixing several kinds of lubricating agents having specific abilities have been proposed. For instance, a mixed lubricating agent of perfluoroalkylcarboxylic acid ester and aliphatic acid was disclosed in JP-A-62-103828 (1987). A mixed lubricating agent of perfluoroalkyl carboxylic acid ester and perfluoropolyether was disclosed in JP-A-62-103838 (1987). A mixed lubricating agent of perfluoroalkyl carboxylic acid ester and higher aliphatic acid was disclosed in JP-A-60-107732 (1985). A mixed lubricating agent of perfluoropolyether and long chain hydrocarbon for long duration of superior lubricating effect under various operating condition was disclosed in JP-A-5-258286 (1993). A mixed lubricating agent of polar perfluoropolyether and non-polar perfluoropolyether for improving duration of lubricating film was disclosed in JP-A-6-28665 (1994). A method for accumulating at least two kinds of lubricants, each of which had mutually different viscosity such as a high viscosity and a low viscosity respectively, on a magnetic disk was disclosed in JP-A-4-76816 (1992). A method for forming a lubricating agent composite layer composed of a lubricant having a preferable adhesiveness to a magnetic disk surface and a lubricant having a preferable adhesiveness to a magnetic head was disclosed in JP-A-1-302529 (1989). A lubricating layer composed of a first layer which was formed by a vacuum deposition method and a liquid layer which was accumulated on the first layer as a second layer was disclosed in JP-A-3-207021 (1991).

In accordance with the prior art described above, advantages such as obtaining characteristics which have not been obtained by a lubricating film composed of a single component, and as coexisting necessary several characteristics by using a plural kinds of lubricants can be expected.

As treating methods for a lubricating surface of the magnetic disk, various methods have been disclosed, depending on the kinds of coating material of the magnetic disk surface. Generally, methods of applying a fluorine group surface active agent or a lubricant which is chemically inactive and has low surface energy have been used. Here, the fluorine group surface active agent and the lubricant are, for example, perfluoroalkyl compounds expressed by the following general formula as disclosed in JP-A-2-145550 (1990);

where n=3~12, or perfluoropolyoxyalkyl compounds expressed by the following general formula as disclosed in U.S. Pat. No. 3,778,308 and JP-A-64-56688 (1989);

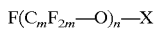 (XVI)

where, n=3~50, m = natural number.

In the above two general formulas, X is a polar group of various types, such as —$SO_2$Me (Me is K or Na), —$SO_2$Fe, —COOH, —$SO_2$H, —OH, and the like as disclosed in JP-A-61-42727 (1986), JP-A-58-29147 (1983), and JP-A-2-145550 (1990). Further, hereto rings, amides, or ester groups were disclosed in JP-A-61-10368 (1986), JP-A-60-34924 (1985), JP-A-61-4727 (1986), and JP-A-61-155345 (1986). Furthermore, alkoxysilane groups and others which react and adhere to the surface are disclosed in JP-A-64-56688 (1989).

With the magnetic disk apparatus, an interval between a magnetic head and a magnetic disk of 100 nm is practically used at present. However, the interval must be make narrower than ever in order to increase recording density.

Concretely saying, an object of the interval is equal to or less than 70 nm, that is a mean free path of air. In the above region, stable head levitation can not be expected by hydrodynamic reason. As for a lubricating system which can be usable in a case when the head levitation is less than the mean free path of air, a wet disk drive system which utilizes a liquid floating system is disclosed in JP-A-3-119580 (1991). However, in accordance with decreasing the interval between the magnetic head and the magnetic disk, a problem that the magnetic head readily adheres to the magnetic disk is caused because the lubricant is apt to adhere to the head.

In order to avoid the above adherence and to decrease the interval between the head and the disk, it becomes necessary to decrease viscosity of the lubricant. However, decreasing the viscosity of the lubricant causes the lubricant to spin off from the disk by centrifugal force generated by rotation of the disk, thinning the lubricating film, and hinders smooth and effective lubrication. The above problem can be solved by continuous supply of lubricant as disclosed in JP-A-3-119580 (1991).

On the other hand, a lubricating system without a complex lubricant supplying system, which can correspond to the head levitation equal to or less than the mean free path of air, has not been disclosed. In order to realize superior lubricating effect with a lubricating film as thin as close to a single molecular film, under the above severe sliding condition, it is necessary to adhere the lubricant chemically on the surface of the magnetic disk. However, once the lubricant is scratched off from the surface of the magnetic disk by collision of the head and the disk, the lubricating property at the surface of the magnetic disk is lost. Therefore, a lubricant having a self-repairing ability, whereby the sliding surface recovers lubricant scratched off the sliding surface, is desired.

Hereafter, the interval between the head and the disk in the magnetic disk apparatus will necessarily decrease further to be ultramicro-levitation or contact recording.

On account of decreasing the amount of head levitation, continuous sliding time of the head increases inevitably. Therefore, decreasing dynamic frictional force and friction between the magnetic disk and the magnetic head or a head slider mounted with the magnetic head, that is continuous sliding endurance ability, are characteristics of the lubricant which must be improved. With a small size magnetic disk apparatus, surface roughness and waviness of the disk must be small in order to maintain stable ultramicro-levitation. Further, since the motor for rotating the magnetic disk has a small torque, serious problems are caused such as becoming incapable of starting up the magnetic disk rotation by high maximum static frictional force (hereafter called adhesion) generated between the head and the magnetic disk at starting up of the magnetic disk apparatus, and as damaging the magnetic head. Accordingly, in view of reliability, lubricating film having a superior low adhesiveness becomes necessary. That is, the magnetic disk hereafter must have compatibility of both continuous sliding endurance and low adhesiveness.

Generally speaking, the continuous sliding endurance and the adhesiveness are incompatible in structure of the lubricating film and material for composing the lubricating film, and the compatibility of the continuous sliding endurance and the adhesiveness is very difficult with a lubricating film composed of a single component of the prior art. For instance, when the film thickness of the lubricating film is thick, it is advantageous for the continuous sliding endurance, but disadvantageous for the adhesiveness. With a lubricating film composed of a single component having some adhesiveness, excess lubricant exists in a weakly adsorbed condition or no adsorbed condition as the lubricant is far from the surface of the disk (hereafter called excess lubricant) in addition to the lubricant which is strongly adsorbed at the surface of the disk, and the excess lubricant operates more advantageously for the continuous sliding endurance as much the amount of the lubricant exists, and more disadvantageously for the adhesiveness. Degree of the adhesiveness has a tendency to differ depending on the kind of the excess lubricant. Accordingly, maintaining slide reliability of the magnetic disk with the lubricating film composed of a single component, as disclosed in JP-A-4-95217 (1992), is difficult.

Among mixed lubricants for realizing high performance and multifunction of the lubricant by using a plurality of lubricants having superior respective characteristics, the lubricants disclosed in JP-A-61-113126 (1986), JP-A-3-25720 (1991), JP-A-2-240828 (1990), JP-A-4-311812 (1992), and JP-A-6-28665 (1994) can maintain the continuous sliding endurance, but readily generate strong adhesiveness on account of non-polar lubricants, and accordingly, compatibility of the continuous sliding endurance and the low adhesiveness is deemed as difficult.

In realizing the mixed lubricant, a method for forming the lubricating film is an important point. For instance, if a plurality of lubricants disclosed in JP-A-1-302529 (1989) are mixed mechanically to be a homogeneous solution and applied to the disk, forming individual layers of the respective lubricants becomes difficult; and additionally, if adsorbing character of the respective lubricants differs, the lubricants having a high adsorbing character are selectively adsorbed onto the disk surface, the proportion of the respective lubricants in the solution changes, and forming a stable lubricating film becomes impossible. With the vacuum deposition method as disclosed in JP-A-3-207021 (1991), the process for forming a lubricating layer becomes complex, and it can not be deemed necessarily as advantageous in view of quality control and manufacturing cost. As described above, a high performance lubricating film having sufficient continuous sliding endurance, low adhesiveness, and high coating ability necessary for corrosion resistance, and any method for forming the high performance film, are not disclosed.

The present application relates to a novel lubricating system relating to a lubricating film used at the interval between the magnetic head and the magnetic disk which slide in a region smaller than the mean free path of air.

The lubricating film which performs a superior lubricating effect under the above described severe sliding condition must be adsorbed strongly to the surface of the magnetic disk and must not be scratched off from the surface by sliding. Further, self-repairing ability for repairing itself even if the lubricant is scratched off from the disk surface is indispensable.

SUMMARY OF THE INVENTION (1) Objects of the Invention

One of the objects of the present invention is to provide a magnetic disk, and a magnetic disk apparatus, provided with a high performance lubricating film, whereby continuous sliding endurance and low adhesiveness corresponding to ultramicro-levitation or contact recording can be made compatible.

Further, one of the objects of the present invention is to provide a magnetic disk apparatus having a minimum interval between respective geometrical average surface of a magnetic head and a magnetic disk, of 50–70 nm, and a magnetic disk, wherein the magnetic disk and the magnetic disk apparatus are provided with lubricating film which is formed on the magnetic disk surface and adsorbed rigidly to the surface, and has a self-repairing function, by re-adsorbing the lubricating film, to recover the lubricating film which has been scratched off by sliding with the magnetic head.

(2) Methods Solving the Problems

In order to solve the above described problems of the prior art, the present invention uses any agent selected from perfluoropolyether group compound lubricating agents having preferable low adhesiveness expressed by the following general formulas of (II) and (III);

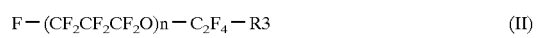  (II)

  (III)

where, R3 and R4 are respectively a monovalent residual group, and n is an integer, and perfluoropolyether group compound lubricating agents having preferable continuous sliding endurance expressed by the following general formula of (I);

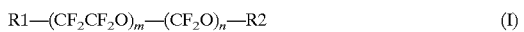  (I)

where, R1 and R2 are respectively a monovalent residual group, and respectively m, n is an integer, and provides a high performance lubricating film whereby low adhesiveness and continuous sliding endurance are made compatible by forming a layer individually with respective lubricating agents, and forms a lubricating film by accumulating the layers. The lubricating agent having the preferable low adhesiveness effect is arranged at the most interior layer and the lubricant having the preferable continuous sliding endurance is arranged at the most exterior layer. The lubricating layers comprising at least two layers can be adoptable.

The lowest lubricating layer is formed by a dipping method, and the exterior lubricating layer is preferably formed by a spin coating method or a spray method.

The magnetic disk can be utmost 90 mm in diameter.

By using the lubricating agent relating to the present invention, it is possible to make the maximum static friction coefficient between the magnetic disk and the head slider utmost 2.0 at starting up of the magnetic disk apparatus, and to make the dynamic friction coefficient between the magnetic disk and the head slider utmost 1.0 during rotation of the magnetic disk.

Examples of concrete chemical formulas of perfluoropolyether group compounds having the above preferable low adhesiveness are as follows;

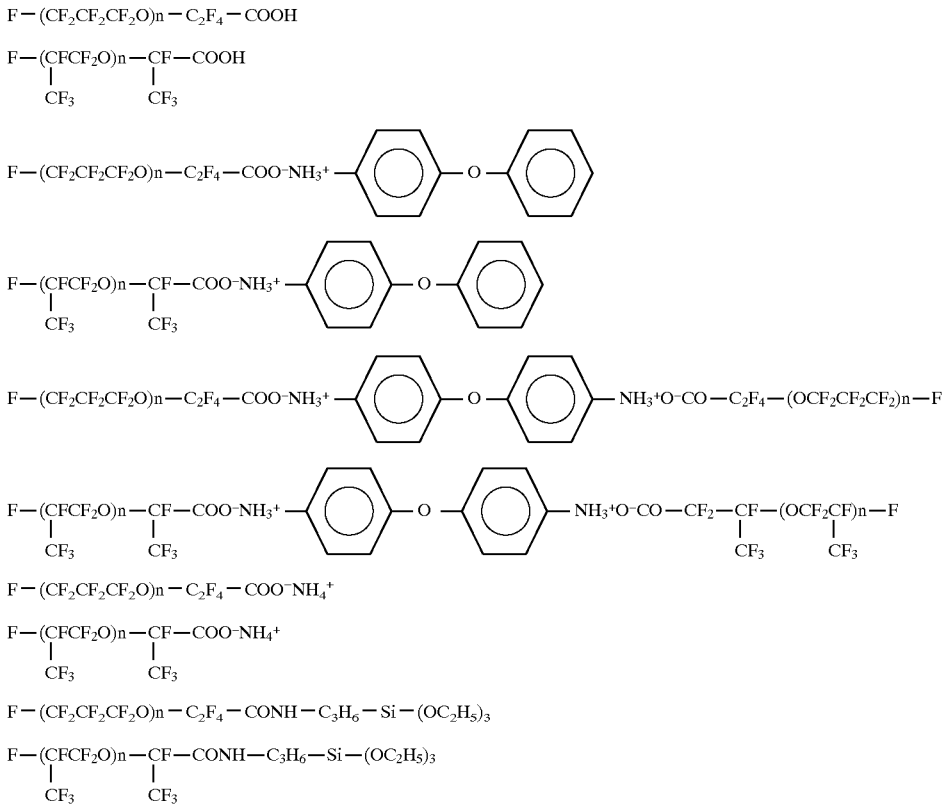

where, n is an integer.

Examples of concrete chemical formulas of polyether group compounds having the above superior continuous sliding endurance are as follows;

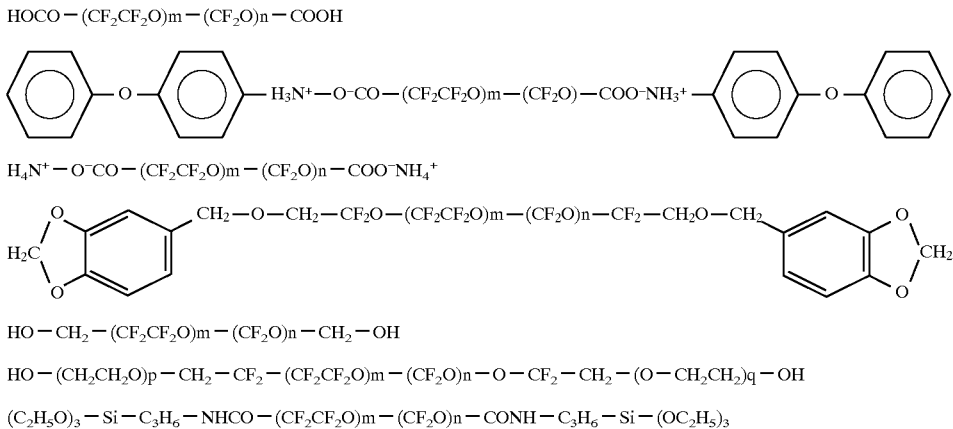

where, m, n, p, q are integers.

However, the present invention is not restricted by the above examples.

In forming a layer of the lubricating agent, it is preferable that the lowest lubricating layer is formed by a dipping method, and the most exterior lubricating layer is formed by a spinning method or a spray method.

The lubricating film of the present invention comprises at least two kinds of lubricating agents, and each of the lubricating agents forms respective layers and the layers are laminated. The lubricating agents comprise at least one kind of lubricating agent having preferable low adhesiveness and at least one kind of lubricating agent having superior continuous sliding endurance. In accordance with forming the lubricating film composed in the manner as above described, the low adhesiveness and the continuous sliding endurance can be made compatible, and the reliable magnetic disk and the magnetic disk apparatus corresponding to ultramicrolevitation or contact recording can be obtained.

If the most exterior layer of the lubricating layers is formed by the spinning method or the spray method, contamination of the lubricating agent for the most exterior layer with the lubricating agent for the most interior layer can be avoided.

The present invention relates to a magnetic recording apparatus comprising the magnetic disk which comprises a non-magnetic substrate whereon primary coating film, magnetic film, protective film, and lubricating film are orderly formed, and connected to a rotation driving mechanism, the magnetic head for writing and reading information to/from the magnetic disk, and a head accessing mechanism, and the minimum interval between respective geometrical average surfaces of the magnetic head and the magnetic recording medium of the magnetic recording apparatus is set equal to or less than 70 nm, the mean free path of air, wherein the lubricating film formed on the magnetic disk surface has a self repairing function, the lubricating film is adhered rigidly to the medium surface, the lubricating film decreases the friction coefficient between the magnetic head and the magnetic disk by causing an endothermic effect for cooling the sliding surface when the lubricating film is scratched off by the sliding, and accordingly, the sliding endurance of the magnetic head and the magnetic disk are improved.

A method for forming the self-repairable lubricating film on the magnetic disk surface comprises the steps of forming an adhesion enhancing layer between the lubricating agent and the magnetic film, fixing the adhesion enhancing layer to the magnetic film surface, and combining the adhesion enhancing layer and the lubricating agent. The combination of the adhesion enhancing layer and the lubricating agent preferably forms a salt or a complex compound. However, the combination can be any form as far as it may be capable of repeating reversal adsorption and desorption by a thermal effect. An ideal combination of the adhesion enhancing layer and the lubricating agent is a combination which is capable of repeating the adsorption and the desorption without any decomposition.

As a method for fixing the adhesion enhancing layer to the magnetic film surface, any of both chemical and physical methods for fixing can be used. However, a larger combining force than the combining force between the adhesion enhancing layer and the lubricating agent is required for the fixing. For instance, a chemical bonding such as silane coupling, and the like are preferable. Further, in order to make many reactive points with lubricating agent exist in a high density at the surface of the adhesion enhancing layer, a Langmuir-Blodgett's film of the adhesion enhancing layer can be used. Simply, the lubricating agent may be applied to the adhesion enhancing layer by an immersion method, or a spinning method. Further, the adhesion enhancing layer can be non-magnetic metallic thin film. In this, case, the lubricating agent is required to have a functional group to form a complex compound with the metal.

One of the examples of a concrete combination of the adhesion enhancing layer and the lubricating agent is a combination wherein an amine compound is arranged at a surface of the adhesion enhancing layer of the magnetic disk, and a lubricating layer is formed on the adhesion enhancing layer with a carboxylic acid terminated lubricating agent. In the above combination, amino groups on the adhesion enhancing layer and carboxyl groups at the terminal of the lubricating agent molecules are combined by forming a carboxylic acid ammonium salt. The bonding force of the above salt depends on the degree of the dissociation of the amine and the acidity of the carboxylic acid terminated lubricating agent. Stronger bonding forces can be obtained with an amine having a larger degree of dissociation and a carboxylic acid terminated lubricating agent having larger acidity. The bonding force of the carboxylic acid ammonium salt decreases in accordance with increasing temperature, and by continuing to increase temperature, the salt bonding is finally canceled and decomposed to the carboxylic acid and the amine. Depending on the composition of the salt and temperature condition, the decomposition reaction is caused by increasing the temperature before the cancellation of the salt bonding. Therefore, in order to realize the bonding which is capable of repeating adsorption and desorption by a thermal effect, it is necessary to choose an adequate condition which does not cause any decomposition reaction.

Another example of the adhesion enhancing layer is a non-magnetic metallic vacuum deposition film such as Al, Ti, Cu and the like as the adhesion enhancing layer on the magnetic disk. Oxides of the above metals can also be used, and it is necessary to form the lubricating film with the carboxyl group terminated lubricating agent. In case of the above combination, the metal and the carboxyl group terminated lubricating agent are combined by forming a metallic salt. The bonding force of the above salt depends on the degree of the dissociation of the metal, the same as in the case of the amine. The bonding force of the metallic salt decreases in accordance with increasing temperature, the same as in the case of the amine and the carboxylic acid, and by continuing to increase temperature, the salt bonding is finally canceled. Depending on the composition of the salt and temperature condition, the decomposition reaction is caused by increasing the temperature before the cancellation of the salt bonding. Therefore, in order to realize the bonding which is capable of repeating adsorption and desorption by a thermal effect, it is necessary to choose an adequate condition which does not cause any decomposition reaction.

When the adhesion enhancing layer is an amine compound, it is necessary to choose an amine group whose dissociation degree is not too large in order to avoid decomposition of the carboxylic acid. On the contrary, if the dissociation degree of the amine is too small, the salt is not formed. An adequate range for forming salt is in a range of dissociation constant (pKa) of 4–8.

On the other hand, a possibility of causing decomposition of the carboxylic acid can be detected from the carboxyl group terminated lubricating agent. In a condition forming a salt with an amine and a carboxylic acid, if an electron density of fluorine atom combined to a carbon atom adjacent to the carboxyl group increases, the decomposition of the carboxylic acid is proceeded. The electron density at the fluorine atom can not be determined directly, but a degree of the electron density at the fluorine atom combined to the carbon atom (primary carbon atom) adjacent to the carboxyl group can be assumed from a chemical shift in the nuclear magnetic resonance spectrum. That means, by comparing the chemical shift of the fluorine atom connected to the carbon atom adjacent to the carboxyl group which does not form any salt with the chemical shift of the fluorine atom when forming a salt to determine how many ppm the chemical shift shifted toward the low magnetic field side by nuclear magnetic resonance analysis, the electron density of the fluorine atom is assumed to be larger as the amount of the shift is larger. The salt having a larger amount of the chemical shift readily causes a decomposition reaction, and the salt having a small amount of the chemical shift hardly causes a decomposition reaction. A range of the chemical shift which hardly causes the decomposition reaction is at most 2 ppm at room temperature, and at most 1 ppm at 150° C. The relationship between the chemical shift and the decomposition of the carboxylic acid is the same when the adhesion enhancing layer is of a metal.

Most of the bonding energy of the above carboxylic acid salt is within a range of 5–20 kcal/mol, and the bonding has a cooling effect of the sliding surface because the lubricating film is scratched off with absorbing sliding heat.

As explained above, the bonding of the adhesion enhancing layer and the lubricating agent is realized by forming a salt, and the salt is deformed by absorbing sliding heat. However, it is necessary to choose an adequate adhesion enhancing layer and lubricating agent in order not to cause a decomposition reaction.

In accordance with the magnetic disk formed in the manner as described above, the lubricating film is superior in sliding endurance because the film has a self repairing function, and the lubricating film realizes a preferable lubricating effect even in the magnetic disk apparatus which has a minimum interval between the geometrical average surfaces of the magnetic disk and the magnetic head equal to or less than the mean free path of air.

The fluorine group alkyl type and polyoxyalkyl type lubricating agents used in the present invention can be partially fluorinated semifluoro type lubricants. Concretely saying, one of fluorine group alkyl chain is C-1800 (Perfluorononanoic acid) made by DAIKIN KOGYO CO., LTD. As for the fluorine group containing a polyoxyalkyl chain, not only a straight chain, but also a branched chain can be used. Further, as for the fluorine group containing polyoxyalkyl chain, both the chains having a functional group at one terminal end of the molecule and having plural functional groups at both terminal ends can be used. Concretely, Krytox made by Du Pont Ltd., Demnum made by DAIKIN KOGYO CO., LTD., Fomblin made by Monte Frose K.K., and their derivatives can be used. As for the functional group at the terminal end, hydroxide group, carboxyl group, sulfone group, and the like can be used. As for the molecular structure of the fluorine group polyoxyalkyl type lubricants, the following molecular structures expressed by the general formulas (XIII), (XIV), and (XV) can be used, and either of the compound solely or a mixture can be used;

     (XIII)

     (XIV)

     (XV)

where, k is an integer at least 3, preferably at least 5. If the number of k is too small, the lubricating effect is not sufficient. When the mixture is used, the number of k may differ mutually depending on respective structure.

Examples of the adhesion enhancing layer of the present invention are alkoxysilane group terminated aromatic amine, large ring azoannulene group derivatives, and the like. With the alkoxysilane group terminated aromatic amine, the adhesion enhancing layer is rigidly fixed to the protective film by dehydration-dealcohol reaction, the aromatic amine in the molecule forms a salt with the fluorine compound to bond mutually, and the fluorine compound film is formed on the surface of the adhesion enhancing layer.

Some examples of the large ring azoannulene group derivatives are various porphyrin and azaphthalocyanine compounds. These compounds have an interaction with the electron accepter portion of the protective film because the central nitrogen ring portion of the molecule is rich in electron donating property, and the compound and the film are combined. Further, the heterocyclic ring containing nitrogen at a terminal end of the molecule forms the fluorine compound and the salt, and then the compound and the salt are combined.

In the adhesion enhancing layer, the combined portion is separated by heating without being decomposed.

As for the magnetic disk used in the magnetic disk apparatus relating to the present invention, if the magnetic head whereby information is written and read is only one for a magnetic disk surface, a diameter of the magnetic disk is preferably at most 90 mm. Because, when the diameter of the disk is larger than 90 mm, it is difficult to make a magnetic disk apparatus having the minimum interval between the magnetic disk and the magnetic head of at most 70 nm, the mean free path of air. On the contrary, if a plurality of the magnetic heads correspond to a magnetic disk surface, the diameter of the magnetic disk is not restricted, but it is difficult to assemble the magnetic disk apparatus.

As for composition of the magnetic disk, a non-magnetic supporter, whereon at least a magnetic layer is provided and a lubricating layer is formed on the magnetic layer directly or via a protective film, is preferable.

Further, a magnetic recording medium composed of the non-magnetic supporter, the magnetic layer, and a surface preparing layer formed between the supporter and the magnetic layer is also applicable. Materials for the non-magnetic supporter, the magnetic layer, and the protective film are not restricted, and any of the materials well known to the skill in the art can be used.

The lubricating agent existing on the magnetic disk by forming a salt with the adhesion enhancing layer in accordance with the above methods separates from the adhesion enhancing layer by absorbing heat generated by sliding between the magnetic head and the magnetic disk. However, the separated lubricating agent releases the heat and is cooled at once in the disk apparatus, and recombines with the adhesion enhancing layer by forming the salt again. In accordance with the above reaction, the lubricating agent can repeat separation and recombination with the adhesion enhancing layer.

As the result, the lubricating film has a self-repairing function, and the magnetic disk is coated always with the lubricating agent to have superior sliding endurance. That is, the magnetic disk apparatus adopting the lubricating method of the present invention has almost the same amount of the lubricating agent which is scratched off by sliding as the self-repairing amount of the lubricating agent. Accordingly, a preferable lubricating effect is realized.

Although it is very difficult to lubricate the sliding surface of the magnetic disk apparatus having the minimum interval between geometrical average surfaces of the magnetic disk and the magnetic head equal to or less than the mean free path of air, sliding endurance of the magnetic disk is superior.

DETAILED DESCRIPTION OF THE EMBODIMENTS

Figure 1:
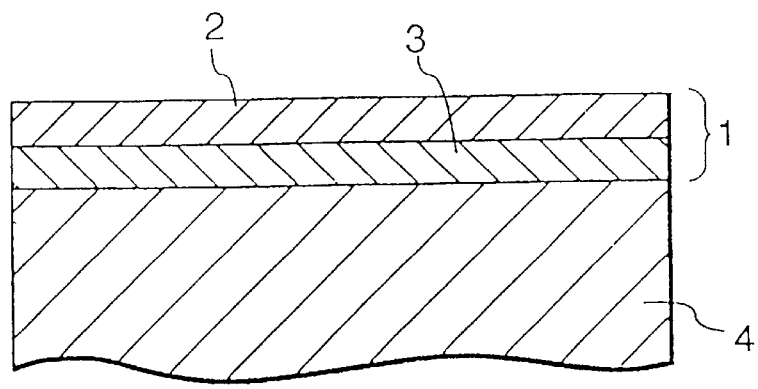
FIG. 1 is a schematic cross section of the lubricating film relating to the present invention.

Hereinafter, the present invention is explained in detail referring to embodiments. However, the present invention is not restricted by the embodiments.

(Embodiment 1)

A sputtered magnetic disk was prepared by orderly forming a NiP surface preparing film of 10 μm, a Cr intermediate film of 0.5 μm, a Co-Cr-Pt magnetic film of 60 nm, and a carbon protective film of 20 nm on an aluminum alloy substrate having a mirror finished surface of 3.5 inches in diameter. Surface roughness of the disk was Ra 1.2 nm in center line average height.

Subsequently, a solution (1) was prepared by dissolving a fluorine group lubricating agent expressed by the following structural formula (a) into fluorine group solvent (PF5052 made by Sumitomo 3M Co.) to a concentration of 0.01% by weight. When the fluorine group lubricating agent (a) is applied onto a magnetic disk, the agent is adsorbed rigidly to the surface of the magnetic disk because the agent contains functional groups having a strong adsorptive property;

(a)

(Average Molecular Weight is 4000)

Further, a solution (2) was prepared by dissolving a fluorine group lubricating agent expressed by the following structural formula (b) into a fluorine group solvent (PF5052 made by Sumitomo 3M Co.) to a concentration of 0.007% by weight. The lubricating agent (b) is readily adsorbed by a first layer and the magnetic disk surface because the agent has polar functional groups;

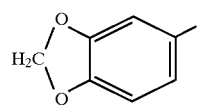 $CH_2-O-CH_2-CF_2O-(CF_2CF_2O)m-(CF_2O)n-CF_2-CH_2O-CH_2$ 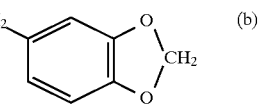
(b)

(Average Molecular Weight is 2000)

The solution (1) was applied onto the sputtered magnetic disk by a dipping method, and dried sufficiently. Conditions of the dipping application of the solution (1) were retaining time in the solution 180 seconds, and withdrawing speed from the solution 2.5 mm/second. Then, excess fluorine group lubricating agent (a) which was not adsorbed onto the disk surface was cleaned off by dipping and moving up and down the applied disk in the fluorine group solvent for 180 seconds, and withdrawing from the solvent by a low speed of 1 mm/second. In accordance with the above processing, a lubricating layer (first layer) composed of only the fluorine group lubricating agent (a) which was rigidly adsorbed onto the disk surface was formed on the sputtered magnetic disk surface. Film thickness of the first layer was about 2.5 nm.

Subsequently, a second layer composed of the fluorine group lubricating agent (b) was formed on the first layer by a spinning application of the solution (2). The spinning application was performed by supplying the solution (2) with a rate of 10 ml/minute onto the disk surface which was rotating by a low speed of 100 rpm, after wetting the disk surface thoroughly with the solution (2), and spinning off the solution by rotating the disk by a speed of 2500 rpm. In accordance with the above processing, the second layer composed of the fluorine group lubricating agent (b) was laminated onto the first layer which was composed of the fluorine group lubricating agent (a) on the sputtered magnetic disk surface. Film thickness of the second layer was about 1.6 nm.

FIG. 1 indicates a schematic cross section of the lubricating film formed by the above described process. The lubricating film 1 has a laminated structure which is composed of a lubricating agent layer 3 of the first layer formed on the protective film 4 at the magnetic disk surface, and the lubricating agent layer 2 of the second layer laminated on the first layer 3.

Figure 2A:
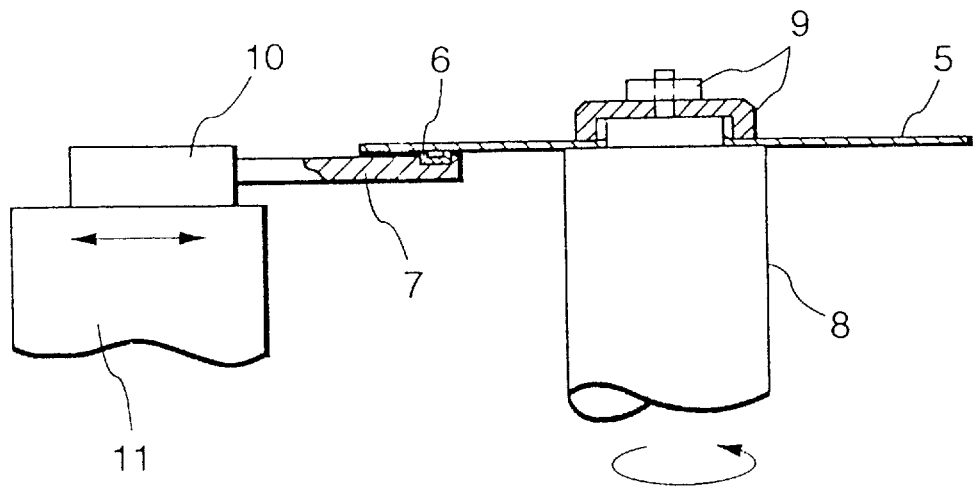
FIGS. 2(a) and 2(b) are a schematic partial cross section and a schematic plan view of an apparatus for determining characteristics of the lubricating film, respectively.
Figure 2B:
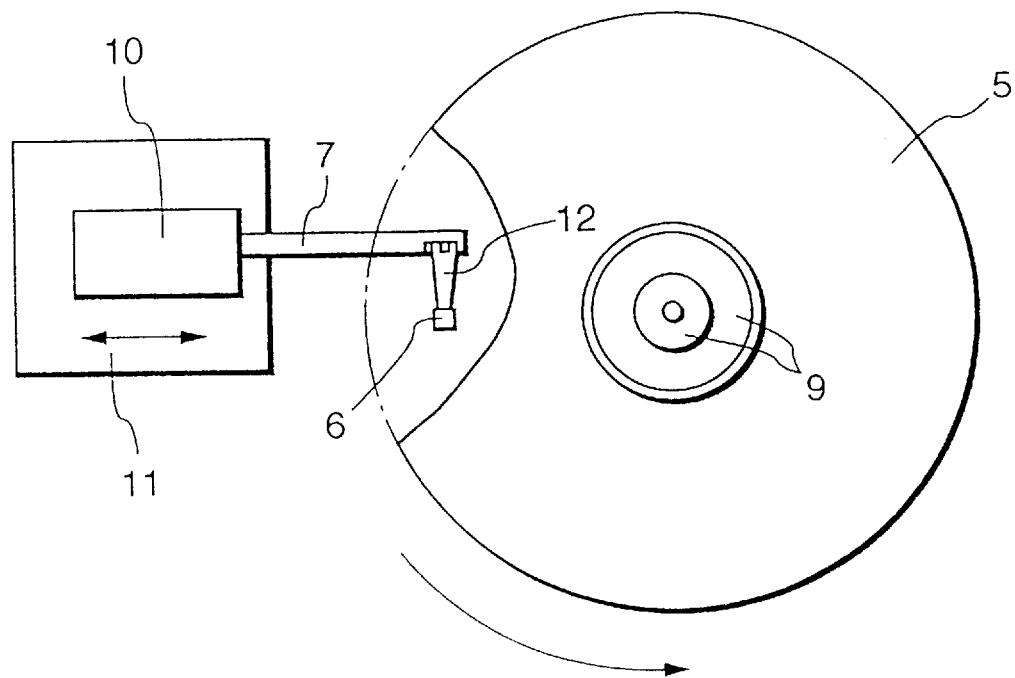

In order to confirm continuous sliding endurance, low adhesiveness effect, and corrosion resistance of the sputtered magnetic disk provided with the lubricating film composed of the first and the second layers, measurement was performed with the following conditions. FIG. 2(a) and 2(b) indicate a schematic partial cross section and a schematic plan view of a measuring apparatus for the continuous sliding endurance and adhesiveness, respectively.

The magnetic disk 5 to be measured was attached to a spindle 8 which was connected directly to a motor provided at a lower portion of the apparatus, and fixed with a disk holder 9. The head slider 6 was an in-line type (20T made of $Al_2O_3$, TiC) wherein a rail surface contacted in a forward direction with a rotating direction of the disk 5, and fixed to an arm 7 connected to a load cell 10 with a gimbal 12. A stage 11 fixing the load cell 10 was movable toward a radial direction of the disk, and evaluation of respective tracks was possible. A friction force generated between the head slider 6 and the magnetic disk 5 by rotating the motor was measured by the load cell 10.

In experiments for evaluating continuous sliding endurance the head slider slid continuously by 200,000 times in a condition of contacting with the disk, and the maximum dynamic friction coefficient between the head slider and the magnetic disk and the number of rotations till the disk crashed were measured. The crashing of the disk was in a condition wherein the carbon protective film at the most interior layer of the lubricating film was abraded completely and the magnetic film was exposed. Therefore, once the crashing occurred, an abrasion trace which was visible by naked eyes was generated. Therefore, the number of rotations until the crashing occurred was measured, and the experiment was terminated at once. As for the maximum dynamic friction coefficient when the crashing of the disk occurred after less than 200,000 rotations, the maximum dynamic friction coefficient until the number of rotations when the crashing of the disk occurred was adopted. The measurement was performed with a pressing load of the head of 5 grams and the number of disk rotations of 150 rpm.

The adhesiveness was measured by rotating the disk in a slow speed under a condition wherein the head slider and the disk were contacted, and determining the maximum static friction coefficient generated soon after the rotation started. The measurement was performed with a pressing load of the head of 5 grams and the number of the disk rotation of 1 rpm.

The corrosion resistance was measured by determining a contact angle with water which can be considered as an index of corrosion resistance. As corrosion of the magnetic disk is generated by water adsorbed on the disk surface, the corrosion can be prevented by making the disk surface water repellent. Accordingly, a degree of corrosion resistance can be evaluated by determining the contact angle with water. The determination of the contact angle was performed with pure water in 30 seconds after dropping the water. The result of the determination of the contact angle with water is indicated in Table 1;

TABLE 1

| | Maximum static friction coefficient | Dynamic friction co-efficient | Number of rotations until crashing ($\times 10^3$ rotation) | Contact angle with water (deg.) |
|---|---|---|---|---|
| Embodiment 1 | 0.09 | 0.34 | >200 | 107 |
| Embodiment 2 | 0.28 | 0.15 | >200 | 114 |
| Embodiment 3 | 0.17 | 0.7 | >200 | 112 |
| Embodiment 4 | 0.14 | 0.68 | >200 | 103 |
| Embodiment 5 | 0.2 | 0.2 | >200 | 110 |
| Embodiment 6 | 0.16 | 0.65 | >200 | 107 |
| Embodiment 7 | 0.17 | 0.52 | >200 | 110 |
| Comp. ex. 1 | 3.4 | 2.8 | 21 | 82 |
| Comp. ex. 2 | 4.2 | 1.86 | 92 | 76 |
| Comp. ex. 3 | 2.9 | 5.3 | 56 | 94 |
| Comp. ex. 4 | 3.72 | 4.64 | 5 | 88 |
| Comp. ex. 5 | 4.4 | 1.84 | 96 | 74 |
| Comp. ex. 6 | 3.5 | 3.1 | 123 | 78 |

Remarks; Comp. ex.: Comparative example

In the present embodiments, the spinning method was adopted for forming the second layer. However, the second layer can be formed also by the dipping method as well as the first layer. But when forming the second layer by the dipping method, there is a possibility to contaminate the solution (2) with the fluorine group lubricating agent (a) by dissolving the fluorine group lubricating agent from the surface of the disk into the solution (2). Therefore, the spinning method and the spray method are preferable.

(Embodiment 2)

A sputtered magnetic disk was prepared by the same method as embodiment 1. Subsequently, a first layer was formed by applying a fluorine lubricating agent (c) expressed by the following structural formula onto the disk by the dipping method under the same condition as embodiment 1, thermally treating the layer at 120° C. for ten minutes, and cleaning. The lubricating agent of the first layer reacts chemically with the surface of the magnetic disk and is fixed rigidly to the surface. Thickness of the first layer was 2.4 nm.

$$F-(CF_2CF_2CF_2O)n-C_2F_4-CONH-C_3H_6-Si(OC_2H_3)_3 \qquad (c)$$

(Average Molecular Weight is 4000)

Subsequently, a second layer was formed on the first layer by applying the same fluorine group lubricating agent (b) as embodiment 1 onto the first layer by a spinning method the same as in embodiment 1. Thickness of the second layer was 1,62 nm.

The continuous sliding endurance and adhesiveness of the lubricating film prepared in the present embodiment were determined by the same method as embodiment 1. The results are indicated in Table 1.

(Embodiment 3)

A sputtered magnetic disk was prepared by the same method as embodiment 1. Subsequently, a first layer was formed by applying a fluorine lubricating agent (d) expressed by the following structural formula by a dipping method to the disk under the same condition as embodiment 1, thermally treating the layer at 120 ° C. for 10 minutes, and cleaning. The lubricating agent of the first layer reacts chemically with the surface of the magnetic disk and is fixed rigidly to the surface. Thickness of the first layer was 1.8 nm.

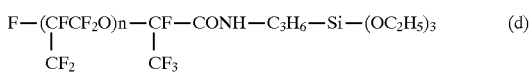

$$F-(CFCF_2O)n-CF-CONH-C_3H_6-Si-(OC_2H_5)_3 \qquad (d)$$
$$\phantom{F-(CFCF_2O)n-}|\phantom{CF-CONH-C_3H_6-Si-(OC_2H_5)_3}|$$
$$\phantom{F-(CFCF_2O)n-}CF_2\phantom{-CONH-C_3H_6-Si-(OC_2H_5)_3}CF_3$$

(Average Molecular Weight is 4000)

Subsequently, a second layer was formed on the first layer by applying a fluorine group lubricating agent (e) has polar functional groups, and is readily absorbed by the first layer and surface of the magnetic disk. Thickness of the second layer was 2.48 nm.

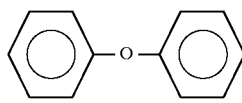 —O— 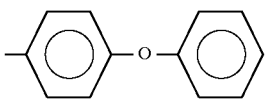 —$H_3N^+O$—CO—$(CF_2CF_2O)m$—$(CF_2O)n$—COO—$NH_3^+$— (e)

(Average Molecular Weight is 4000)

The continuous sliding endurance and adhesiveness of the lubricating film prepared in the present embodiment were determined by the same method as embodiment 1. The results are indicated in Table 1.

(Embodiment 4)

A sputtered magnetic disk was prepared by the same method as embodiment 1. Subsequently, a first layer was formed by applying a fluorine lubricating agent (f) expressed by the following structural formula by a dipping method to the disk under the same condition as embodiment 1, and cleaning. Thickness of the first layer was 2.83 nm.

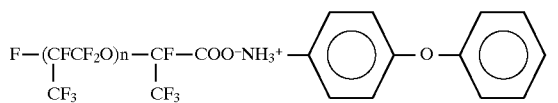

$$F—(CFCF_2O)n—CF—COO^-NH_3^+— \quad (f)$$
$$\phantom{F—(CFCF_2O)n—}|\phantom{CF}\;|$$
$$\phantom{F—(CFCF_2O)n—}CF_3\;\;CF_3$$

(Average Molecular Weight is 4000)

Subsequently, a second layer was formed on the first layer by applying a fluorine group lubricating agent (g) expressed by the following structural formula onto the first layer by a spinning method the same as in embodiment 1. The fluorine group lubricating agent (g) has polar functional groups, and is readily absorbed by the first layer and surface of the magnetic disk. Thickness of the second layer was 1.56 nm.

HO—$CH_2$—$(CF_2CF_2O)m$—$(CF_2O)n$—$CH_2$—OH (g)

(Average molecular weight is 2000)

Characteristics of the lubricating film prepared in the present embodiment were determined by the same method as embodiment 1. The result is indicated in Table 1.

(Embodiment 5)

A sputtered magnetic disk was prepared by the same method as embodiment 1. Subsequently, a first layer was formed by applying the same fluorine lubricating agent (c) as the first layer in embodiment 2 by dipping, heating, and cleaning the same as in embodiment 1. Thickness of the first layer was 2.4 nm. Subsequently, a second layer was formed on the first layer by applying the same lubricating agent (g) as embodiment 4 onto the first layer by a spinning method the same as in embodiment 1. Thickness of the second layer was 1.61 nm.

Characteristics of the lubricating film prepared in the present embodiment were determined by the same method as embodiment 1. The result is indicated in Table 1.

(Embodiment 6)

A sputtered magnetic disk was prepared by the same method as embodiment 1. Subsequently, a first layer was formed by applying a solution of the same fluorine lubricating agent (c) as the first layer in embodiment 2 by dipping, heating, and cleaning the same as in embodiment 1. Thickness of the first layer was 2.4 nm.

Subsequently, a second layer was formed on the first layer by applying the same lubricating agent (g) as in embodiment 4, 5 onto the first layer by a spraying method. The spraying method was performed by spraying a solution of the lubricating agent (g) with a supplying rate of 50 ml/min. onto the first layer of the disk which was rotating in a low speed of 100 rpm so as to wet the whole surface of the disk thoroughly with the solution of the lubricating agent, and spinning off the solution by high speed rotation of the disk as 2500 rpm. Thickness of the second layer was 1.83 nm.

The continuous sliding endurance and adhesiveness of the lubricating film prepared in the present embodiment was determined by the same method as embodiment 1. The results are indicated in Table 1. In comparison with embodiment 5 wherein the combination of the lubricating agents is the same, but the second layer is formed by the spinning method, it is revealed that the lubricating film prepared by the present embodiment has almost similar performance with the lubricating film in embodiment 5.

(Embodiment 7)

A sputtered magnetic disk was prepared by the same method as embodiment 1. Subsequently, a first layer was formed by applying the same fluorine lubricating agent (c) as the first layer in embodiment 2 by dipping, heating, and cleaning the same as in embodiment 1. Thickness of the first layer was 2.2 nm.

Subsequently, a solution was prepared by dissolving the same lubricating agent (a) as the first layer in embodiment 1 into the same fluorine solvent as embodiment 1 to a concentration of 0.001% by weight. Then a second layer was formed on the first layer by applying the above solution of the lubricating agent (a) by the spinning method under the same condition as embodiment 1. Thickness of the second layer was 1.1 nm.

Further, a solution was prepared by dissolving the same lubricating agent (e) as the second layer in embodiment 3 into the same fluorine solvent as embodiment 1 to a concentration of 0.007% by weight. Then a third layer was formed on the second layer by applying the above solution of the lubricating agent (e) by the spinning method under the same condition as embodiment 1. Thickness of the third layer was 1.6 nm. Accordingly, a lubricating film composed of laminated three layers, the first layer was a lubricating layer reacted chemically and fixed rigidly to the surface of the disk, and the second and the third layers were composed of two kinds of lubricating agents, respectively, both of which have remarkable adsorptive properties to the disk and the first layer, was formed on the surface of the disk.

The continuous sliding endurance and adhesiveness of the lubricating film prepared in the present embodiment were determined by the same method as embodiment 1. The results are indicated in Table 1.

(Comparative Example 1)

A first layer was formed on a same sputtered magnetic disk as embodiment 1 by applying the same lubricating agent (a) as embodiment 1 with the dipping method, drying, and cleaning under the same condition as embodiment 1. Thickness of the first layer was 2.6 nm. Subsequently, a second layer was formed by applying a non-polar fluorine group lubricating agent (h) expressed by the following structural formula on the first layer by the spinning method under the same condition as embodiment 1. Thickness of the second layer was 1.34 nm.

F—$(CF_2CF_2CF_2O)n$—$CF_2$—$CF_3$ (h)

(Average Molecular Weight is 4000)

The continuous sliding endurance, adhesiveness, and contact angle with water of the lubricating film prepared in the present comparative example were determined by the same method as embodiment 1. The results are indicated in Table 1.

In comparison of the present comparative example with embodiment 1 which uses the same fluorine group lubricating agent (a) for the first layer, embodiment 1 is superior to the present comparative example 1 in both continuous sliding endurance and adhesiveness. Especially in the adhesiveness, comparative example 1 indicates remarkably high maximum static friction coefficient. It reveals that the non-polar fluorine group lubricating agent readily causes strong adhesion. Further, embodiment 1 has a larger contact angle with water than comparative example 1, and it reveals that embodiment 1 shows higher corrosion resistance than comparative example 1.

(Comparative Example 2)

A first layer was formed on a same sputtered magnetic disk as embodiment 2 by applying the same lubricating agent (c) as embodiment 2 with the dipping method, drying, and cleaning under the same condition as embodiment 1. Thickness of the first year was 1.8 nm. Subsequently, a second layer was formed by applying a non-polar fluorine group lubricating agent (i) expressed by the following structural formula on the first layer by the spinning method under the same condition as embodiment 1. Thickness of the second layer was 1.34 nm.

$CF_3—(CF_2CF_2O)m—(CF_2O)n—CF_3$ (i)

(Average Molecular Weight is 4000)

The continuous sliding endurance, adhesiveness, and contact angle with water of the lubricating film prepared in the present comparative example 2 were determined by the same method as embodiment 1. The results are indicated in Table 1.

In comparison of the present comparative example 2 with embodiments 2 and 5 which use the same fluorine group lubricating agent (c) for the first layer, embodiments 2 and 5 wherein the second layer is composed of polar fluorine group lubricating agents are superior to the present comparative example 2 wherein the second layer is composed of a non-polar fluorine group lubricating agent in both continuous sliding endurance and adhesiveness, and have preferable corrosion resistance.

(Comparative Example 3)

A first layer was formed on a same sputtered magnetic disk as embodiment 3 by applying the same lubricating agent (d) as embodiment 3 with the dipping method, drying, and cleaning under the same condition as embodiment 3. Thickness of the first layer was 1.8 nm. Subsequently, a second layer was formed by applying a non-polar fluorine group lubricating agent (j) expressed by the following structural formula on the first layer by the spinning method under the same condition as embodiment 1. Thickness of the second layer was 2.18 nm.

F—(CFCF$_2$O)n—CF—CF$_3$ (j)
   |           |
   CF$_3$      CF$_3$ (Average Molecular Weight is 4000)

The continuous sliding endurance, adhesiveness, and contact angle with water of the lubricating film prepared in the present comparative example 3 were determined by the same method as embodiment 1. The result is indicated in Table 1.

In comparison of the present comparative example 3 with embodiment 3 which uses the same fluorine group lubricating agent (d) for the first layer, embodiment 3 wherein the second layer is composed of a polar fluorine group lubricating agent is superior to the present comparative example 3 wherein the second layer is composed of a non-polar fluorine group lubricating agent (j) in both continuous sliding endurance and adhesiveness, and has preferable corrosion resistance.

(Comparative Example 4)

A first layer was formed on a same sputtered magnetic disk as embodiment 4 by applying the same lubricating agent (f) as embodiment 4 with the dipping method, drying, and cleaning under the same condition as embodiment 4. Thickness of the first layer was 2.83 nm. Subsequently, a second layer was formed by applying the same non-polar fluorine group lubricating agent (i) as comparative example 2 on the first layer by the spinning method under the same condition as embodiment 1, and cleaning. Thickness of the second layer was 1.78 nm.

The continuous sliding endurance, adhesiveness, and contact angle with water of the lubricating film prepared in the present comparative example 4 were determined by the same method as embodiment 1. The result is indicated in Table 1.

In comparison of the present comparative example 4 with embodiment 4 which uses the same fluorine group lubricating agent (f) for the first layer, embodiment 4 wherein the second layer is composed of a polar fluorine group lubricating agent is superior to the present comparative example 4 wherein the second layer is composed of a non-polar fluorine group lubricating agent in continuous sliding endurance, adhesiveness, and corrosion resistance.

(Comparative Example 5)

A first layer was formed by applying the same lubricating agent (c) as embodiment 6 to a thickness of 2.4 nm, and a second layer was formed by applying the same lubricating agent (i) as the second layer of comparative example 2 by the spinning method under the same condition as embodiment 6. Thickness of the second layer was 1.56 nm.

The continuous sliding endurance, adhesiveness, and contact angle with water of the lubricating film prepared in the present comparative example 5 were determined by the same method as embodiment 1. The result is indicated in Table 1.

In comparison of the present comparative example 5 with embodiment 6 wherein the first layer is composed of the same fluorine group lubricating agent (c) and the second layer is formed by the same spray method, embodiment 6 wherein the second layer is composed of a polar fluorine group lubricating agent is superior to the present comparative example 5 wherein the second layer is composed of a non-polar fluorine group lubricating agent in continuous sliding endurance, adhesiveness, and corrosion resistance.

(Comparative Example 6)

As same as embodiment 7, a lubricating film composed of a first layer which was composed of the fluorine group lubricating agent (c), a second layer which was composed of the fluorine group lubricating agent (a), and a most exterior third layer which was composed of the fluorine group lubricating agent (h) used for the second layer in comparative example 1 was formed. Thickness of the first layer, the second layer, and the third layer was 2.2 nm, 1.1 nm, and 1.32 nm, respectively.

The continuous sliding endurance, adhesiveness, and contact angle with water of the lubricating film prepared in the present comparative example 6 were determined by the same method as embodiment 1. The result is indicated in Table 1.

In comparison of the present comparative example 6 with embodiment 7 wherein the first layer and the second layer are composed of the same fluorine group lubricating agents (c) and (a), embodiment 7 wherein the third layer is composed of a polar fluorine group lubricating agent is superior to the present comparative example 6 in continuous sliding endurance, adhesiveness, and corrosion resistance.

(Embodiment 8)

Figure 3:
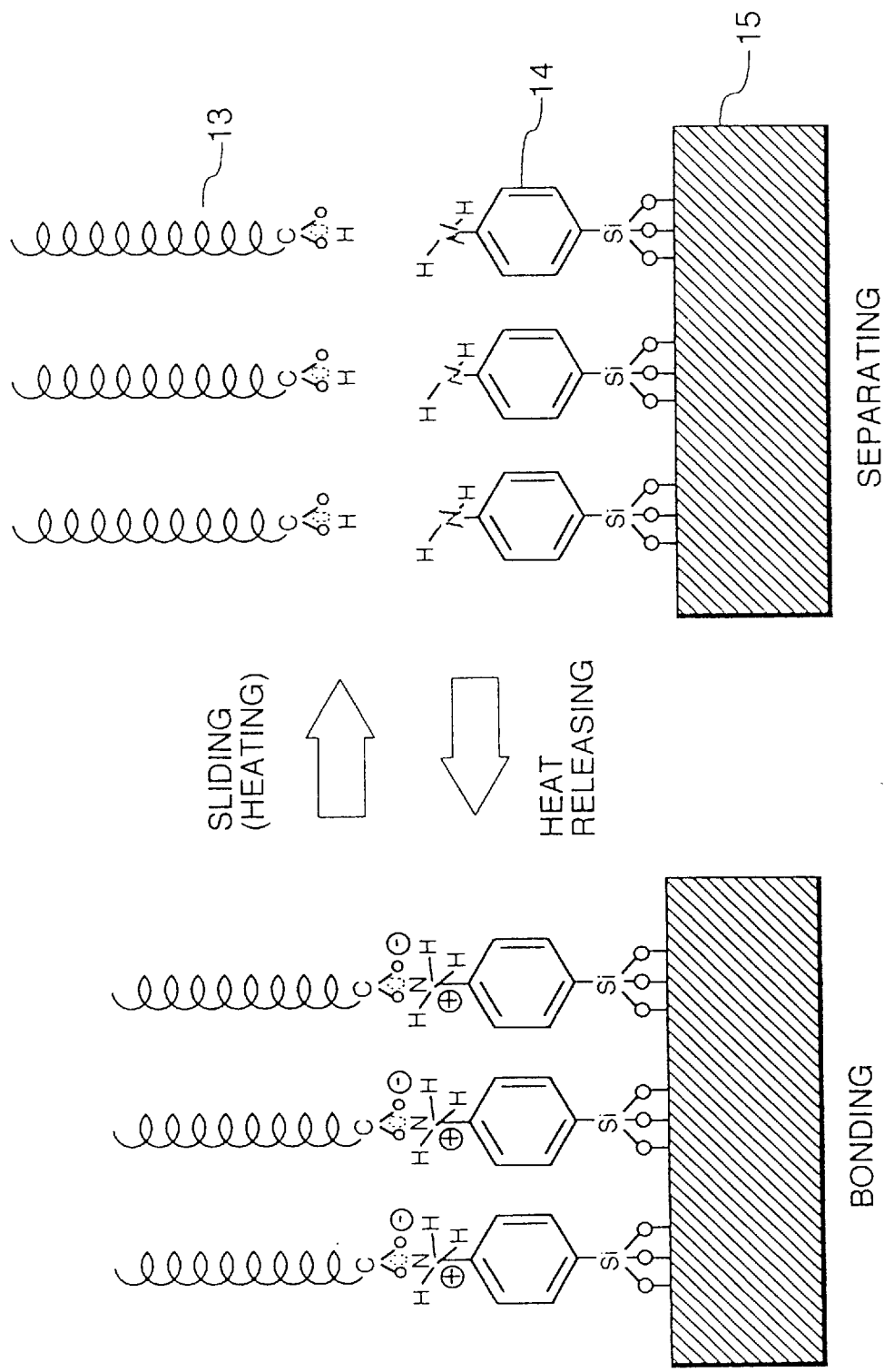
FIG. 3 is a drawing indicating models of a combined state and a separated state of the adhesion enhancing layer and the lubricating agent when p-aminophenyltrimethoxy-silane is used as the adhesion enhancing layer and a carboxylic acid terminated polyoxyalkyl type lubricating agent is used as the fluorine group compound.

Embodiment 8 is explained hereinafter referring to FIG. 3. FIG. 3 indicates a combining state and a separating state schematically of a case when p-aminophenyltrimethoxysilane (A0724 made by Chisso Co.) is used as an adhesion enhancing layer and carboxylic acid terminated polyoxyalkyl type lubricating agent (Demnum SH-2 made by DAIKIN KOGYO CO., LTD.) is used as a fluorine group compound. The numerical mark 13 indicates the fluorine compound having a carboxylic acid at a terminal, the mark 14 is the adhesion enhancing layer, and the mark 15 is a protective film.

Figure 4:
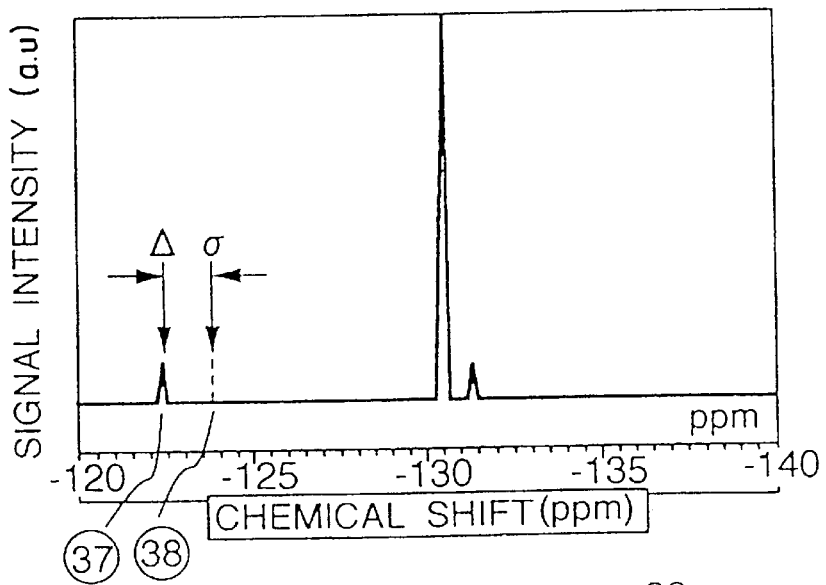
FIG. 4 is a NMR spectrum of fluorine in the carboxylic acid terminated polyoxyalkyl type lubricating agent.

Although the combining state and the separating state indicated in FIG. 3 can not be observed directly, the combining state and the separating state can be confirmed by nuclear magnetic resonance spectrum analysis (NMR spectrum analysis). That means, by measuring the chemical shift of fluorine atom as shown in FIG. 4, the combining state 37 shifts from a non-combining state by $\Delta\delta$ when a low magnetic field is applied. Therefore, a case when $\Delta\delta$ equals to 0 means a state wherein the both compounds do not combine together and are in a separating state.

Figure 5:
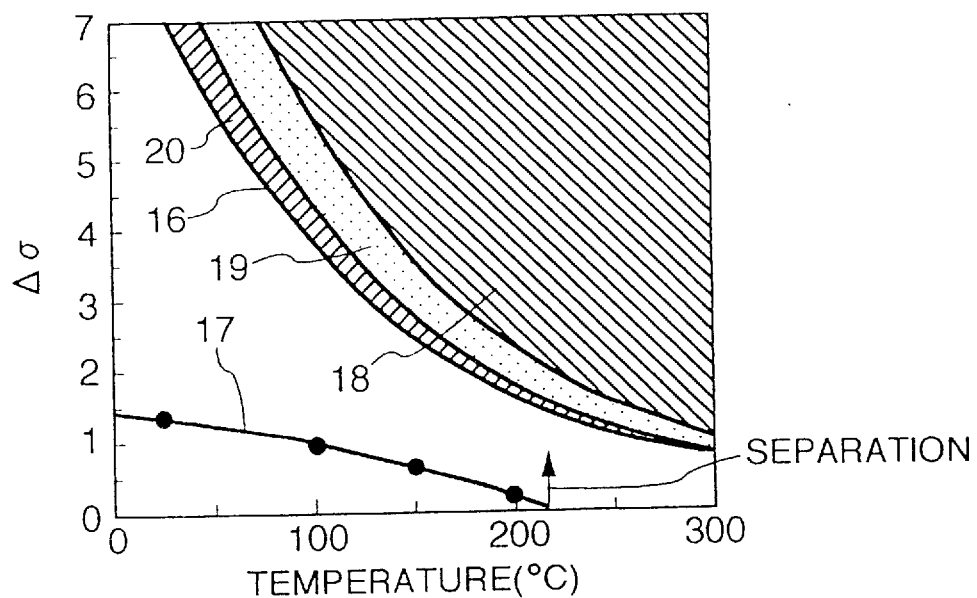
FIG. 5 is a graph indicating a relationship between temperature and Δδ of the carboxylic acid terminated polyoxyalkyl type lubricating agent.

The $\Delta\delta$ of combining state when p-aminophenyltrimethoxysilane for the adhesion enhancing layer and a carboxylic acid terminated polyoxyalkyl type lubricating agent are used are 1.35 at a room temperature, 0.65 at 150° C., and 0 at 200–220° C. as shown by the mark 17 in FIG. 5. That means, at 200–220° C., the adhesion enhancing layer and the carboxylic acid terminated polyoxyalkyl type lubricating agent are separate each other.

On the other hand, in view of a relationship between the temperature, a decomposition temperature of the carbonyl group of the Demnum SH which is one of the carboxylic acid terminated polyoxyalkyl type lubricating agents, and $\Delta\delta$, it is revealed that there is a relationship as shown by a hatching region in FIG. 5. The regions designated by the mark 16 in FIG. 5 are regions wherein decomposition is prior to separation, and respectively regions of 20 mol % (mark 20), 50 mol % (mark 19), and 100 mol % (mark 18) decomposition. Accordingly, the relationship between the temperature and $\Delta\delta$ of p-aminophenyltrimethoxysilane is at most 2.0 ppm at a room temperature, and at most 1.5 ppm at 150° C., both of which do not reach the decomposition region of the carboxyl group. Therefore, it is revealed that the combining and separating reactions of the above compounds can be proceeded reversely only by thermal operation.

Figure 6:
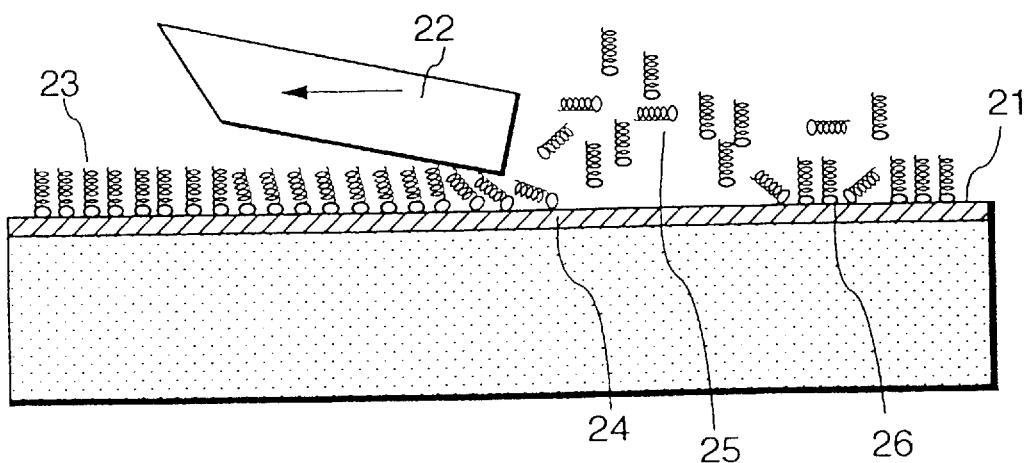
FIG. 6 is a drawing indicating a model of adsorption and desorption of the lubricating agent on the magnetic recording medium.

It is assumed that the adsorption and desorption indicated in FIG. 6 are caused with practical magnetic recording media. That is, a lubricating layer 23 is formed by fixing Demnum SH, which is a carboxylic acid terminated polyoxyalkyl type lubricating agent, on an adhesion enhancing layer 21 which is formed by reacting and fixing p-aminophenylmethoxysilane on a substrate. When a head 22 slides rapidly on the lubricating layer 23, the lubricating agent 25 releases from the adhesion enhancing layer by absorbing sliding heat at the sliding portion, and the lubricating agent 26 recombines with the adhesion enhancing layer by releasing the heat and being cooled at the sliding portion.

(Embodiment 9)

A disk (A) was prepared by forming a Cr layer of 2.25 $\mu$m thick on a surface of an aluminum alloy substrate of 3.5 inches in diameter, which is plated with Ni—P and mirror finished, forming a Co group magnetic film of 0.06 $\mu$m thick on the surface of the Cr layer by sputtering deposition, and forming a carbon protective film of 0.05 $\mu$m thick on the surface of the Co group magnetic film. Subsequently, the disk (A) was immersed into a solution (solvent: methanol) of 0.01% by weight of p-aminophenylmethoxysilane (made by Chisso Co.) for ten minutes, withdrawn slowly from the solution, and heated at 120° C. for 10 minutes. Then, a disk (B) was prepared by cleaning the disk (A) which had p-aminophenyltrimethoxysilane fixed on the surface of the carbon protective film by a chemical reaction. Further, a disk (C) was prepared by immersing the disk (B) into a solution (solvent: perfluorohexane) of 0.05% by weight of a carboxylic acid terminated polyoxyalkyl type lubricating agent (Demnum SH-2, made by DAIKIN KOGYO CO., LTD.) for 5 minutes, withdrawing slowly from the solution, and cleaning again with perfluorohexane. The $\Delta\delta$ of a salt formed by p-aminophenyltrimethoxysilane and carboxylic acid terminated polyoxyalkyl type lubricating agent (Demnum SH-2) was 1.35 ppm at a room temperature, and 0.65 ppm at 150° C.

Figure 7A:
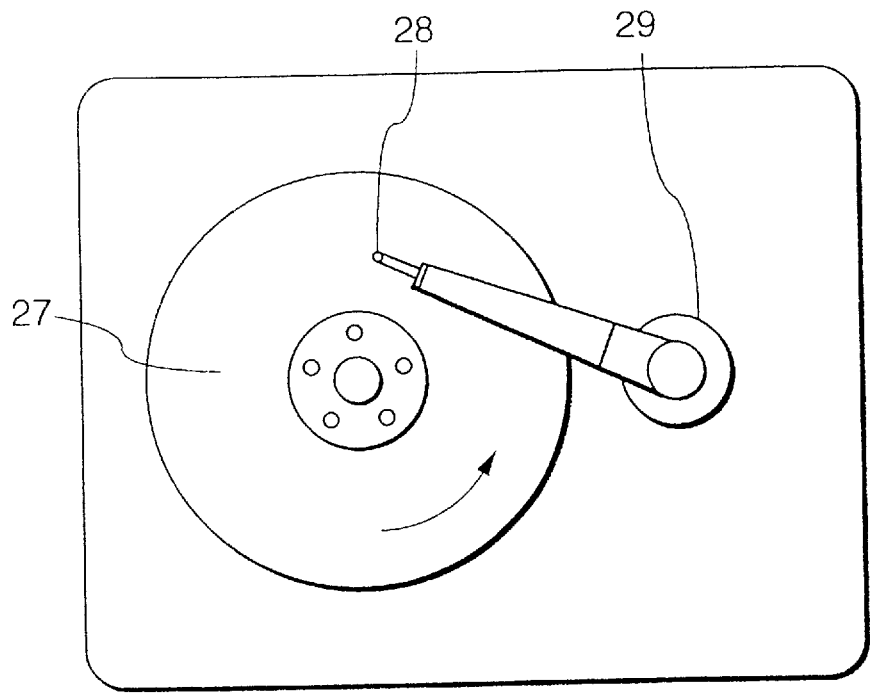
FIGS. 7(a) and 7(b) are a schematic plan view and a schematic partial cross section of an example of the magnetic recording apparatus composition, respectively.
Figure 7B:
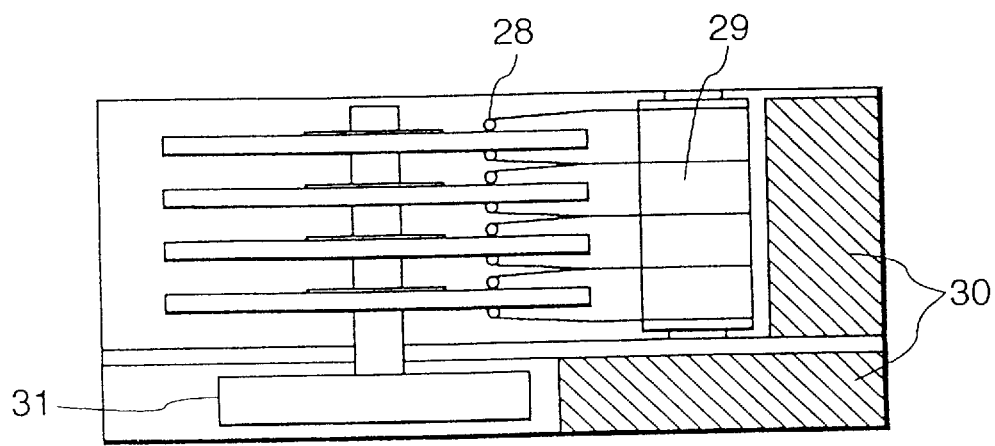

A magnetic recording apparatus was prepared using the disk (C) which had films formed by the above-process. FIGS. 7 (a) and (b) are schematic drawings indicating an arrangement and composition of the magnetic recording apparatus of the present invention. The numeral mark 27 is a magnetic disk, 28 is a magnetic head for regenerating the record, 29 is an actuator, 30 is an electric circuit for regenerating the record and controlling, and 31 is a driving motor. In FIGS. 7(a) and 7(b), the magnetic head and the magnetic disk which was rotated at 6000 rpm by the driving motor 31 were set so as to have a minimum interval between geometric average surfaces of the magnetic head and the magnetic disk of at most 70 nm. As for the magnetic head, an ultra micro load head (20 mg) was used.

In order to evaluate sliding characteristics of the prepared magnetic recording apparatus, sliding endurance was evaluated by the CSS (contact start and stop) test. That is, rotation of the disk started from zero to 6,000 rpm in 18 seconds, was maintained for 1 second, the rotation was decreased to zero rpm in 18 seconds, and maintained for 1 second. The above sequence is regarded as one cycle, and the cycles were repeated with a same track. As an evaluation index for the sliding endurance, the number of the cycles until crashing of the magnetic film occurred was taken. The results of the CSS evaluation test are shown in Table 2.

(Embodiment 10)

The disk (A) was prepared in the same manner as embodiment 9. The disk (A) was immersed into a solution (solvent: toluene) of 0.01% by weight of tetrapyrido-2,3,-porphyradine for 10 minutes, withdrawn slowly from the solution, and dried. A disk (E) was prepared by cleaning the disk, of which surface of the carbon film adsorbed tetrapyrido-2,3,-porphyradine in a manner as described above, with perfluorohexane. Subsequently, a disk (F) was prepared by immersing the disk (E) into a solution (solvent:

perfluorohexane) of 0.05% by weight of carboxylic acid terminated polyoxyalkyl type lubricating agent (Demnum SH-2 made by DAIKIN KOGYO CO., LTD.) for 5 minutes, withdrawing slowly from the solution, and cleaning again with perfluorohexane. The Δδ in NMR of a salt formed by tetrapyrido-2,3,-porphyradine and carboxylic acid terminated polyoxyalkyl type lubricating agent (Demnum SH-2) was 1.15 ppm at a room temperature, and 0.60 ppm at 150° C.

A magnetic recording apparatus was prepared using the disk (F) which had films formed by the above process in the same manner as embodiment 9. The sliding characteristics of the prepared magnetic disk apparatus was evaluated by the CSS (contact start and stop) test. The result of the CSS test is shown in Table 2.

TABLE 2

|  | Result of CSS evaluation test |
| --- | --- |
| Embodiment 9 | 35000 |
| Embodiment 10 | at least 40,000 |

(Comparative Example 7)

As for a comparative example, a disk (D) was prepared by applying a solution (solvent: perfluorohexane) of 0.05% by weight of carboxylic acid terminated polyoxyalkyl type lubricating agent (SH-2) onto the disk (a), and the above CSS test was performed on the disk (D). The result of the CSS test is shown in Table 3.

(Comparative Example 8)

The disk (G) was prepared by immersing the disk (B) into a solution (solvent: perfluorohexane) of 0.05% by weight of carboxylic acid terminated polyoxyalkyl type lubricating agent (Krytox 157FSM made By Du Pont Ltd.) for 5 minutes, withdrawing slowly from the solution, and cleaning the disk again with perfluorohexane. The Δδ of a salt formed by p-aminophenyltrimethoxysilane and carboxylic acid terminated polyoxyalkyl type lubricating agent (Krytox 167FSM) was 2.54 ppm at a room temperature, and 1.45 ppm at 150° C.

A magnetic recording apparatus was prepared using the disk (G) which had films formed by the above process in the same manner as embodiment 8. The sliding characteristics of the prepared magnetic disk apparatus was evaluated by the CSS (contact start and stop) test. The result of the CSS test is shown in Table 3.

TABLE 3

|  | Result of CSS evaluation test |
| --- | --- |
| Embodiment 7 | 50 |
| Embodiment 8 | 6600 |

In accordance with the present invention, both of the maximum static friction force (adhesion) which is generated at soon after starting up of the magnetic disk and the dynamic friction force which is generated during starting up of the magnetic disk, and wearing (continuous sliding endurance) can be reduced. Further, magnetic disks and magnetic disk apparatus having preferable corrosion resistance effect can be provided.

What is claimed is:

1. A magnetic disk comprising a surface preparing film, a magnetic film, a protective film, and a lubricating film which are stacked in sequence on a non-magnetic substrate, wherein said lubricating film contains at least two lubricating layers, of different materials, that include at least two different lubricating agents each of which forms individual layers of said at least two lubricating layers respectively and is laminated, one of the lubricating agents which forms at least one of the individual layers is formed of a perfluoropolyether group compound expressed by the following general formula (I):

R1—(CF$_2$CF$_2$O)m—(CF$_2$O)n—R2    (I)

where, R1, R2 are monovalent residual groups, wherein the perfluoropolyether group compound expressed by the general formula (I) is selected from the group consisting of:

HOCO—(CF$_2$CF$_2$O)m—(CF$_2$O)n—COOH

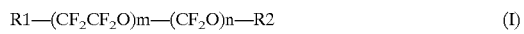

—COO⁻NH$_3$⁺—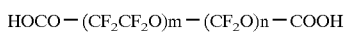

H$_4$N⁺—O⁻CO—(CF$_2$CF$_2$O)m—(CF$_2$O)n—COO⁻NH$_4$⁺

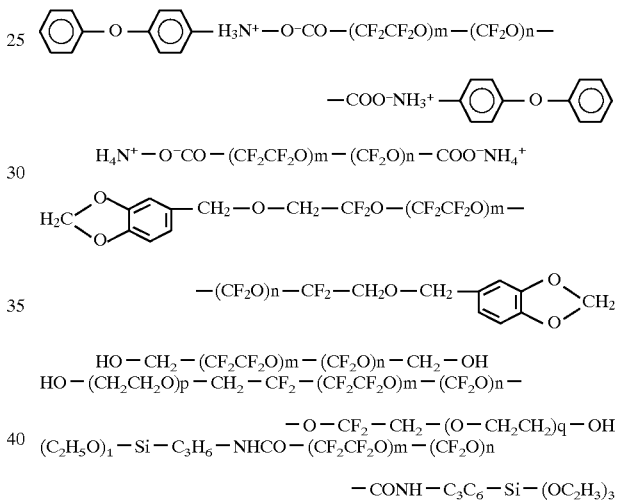

HO—CH$_2$—(CF$_2$CF$_2$O)m—(CF$_2$O)n—CH$_2$—OH
HO—(CH$_2$CH$_2$O)p—CH$_2$—CF$_2$—(CF$_2$CF$_2$O)m—(CF$_2$O)n—

—O—CF$_2$—CH$_2$—(O—CH$_2$CH$_2$)q—OH
(C$_2$H$_5$O)$_1$—Si—C$_3$H$_6$—NHCO—(CF$_2$CF$_2$O)m—(CF$_2$O)n

—CONH—C$_3$C$_6$—Si—(OC$_2$H$_3$)$_3$ where, m, n, p, q are integers, and another of the lubricating agents, which forms another layer of said individual layers is at least one of two kinds of perfluoropolyether group compounds expressed by the following general formulas (II), (III):

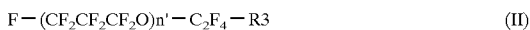

wherein, R3, R4 are monovalent residual groups, n' is an integer, wherein the at least one of the individual layers formed of the compound expressed by the general formula (I) is a layer furthest from the protective film.

2. A magnetic disk as claimed in claim 1, wherein said 5 magnetic disk has a diameter of at most 90 mm.

3. A magnetic disk as claimed in claim 1, wherein said protective film is a carbon film.

4. A magnetic disk is claimed in claim 1, wherein the perfluoropolyether groups compound expressed by the general formulas (II) and (III) is selected from the group consisting of:

$$F-(CF_2CF_2CF_2O)n-C_2F_4-COOH$$

$$F-(CFCF_2O)n-CF-COOH$$
$$\phantom{F-(}| \phantom{CF_2O)n-}|$$
$$\phantom{F-(}CF_3 \phantom{CF_2O)n-}CF_3$$

$$F-(CF_2CF_2CF_2O)n-C_2F_4-COO^-NH_3^+-\langle \bigcirc \rangle-O-\langle \bigcirc \rangle$$

$$F-(CFCF_2O)n-CF-COO^-NH_3^+-\langle \bigcirc \rangle-O-\langle \bigcirc \rangle$$
$$\phantom{xx}|\phantom{xxxxx}|$$
$$\phantom{xx}CF_3\phantom{xxx}CF_3$$

$$F-(CF_2CF_2CF_2O)n-C_2F_4-COO^-NH_3^+-\langle \bigcirc \rangle-O-\langle \bigcirc \rangle-NH_3^+O^-CO-C_2F_4-(OCF_2CF_2CF_2)n-F$$

$$F-(CFCF_2O)n-CF-COO^-NH_3^+-\langle \bigcirc \rangle-O-\langle \bigcirc \rangle-NH_3^+O^-CO-CF_2-CF-(OCF_2CF)n-F$$
$$\phantom{xx}|\phantom{xxxxx}|\phantom{xxxxxxxxxxxxxxxxxxxxxxxxxxxxxxxxxxxxxxxxxxxx}|\phantom{xxxxxxx}|$$
$$\phantom{xx}CF_3\phantom{xxx}CF_3\phantom{xxxxxxxxxxxxxxxxxxxxxxxxxxxxxxxxxxxxxxxxxxxx}CF_3\phantom{xxxx}CF_3$$

$$F-(CF_2CF_2CF_2O)n-C_2F_4-COO^-NH_4^+$$

$$F-(CFCF_2O)n-CF-COO^-NH_4^+$$
$$\phantom{xx}|\phantom{xxxxx}|$$
$$\phantom{xx}CF_3\phantom{xxx}CF_3$$

$$F-(CF_2CF_2CF_2O)n-C_2F_4-CONH-C_3H_6-Si-(OC_2H_5)_3$$

$$F-(CFCF_2O)n-CF-CONH-C_3H_6-Si-(OC_2H_5)_3$$
$$\phantom{xx}|\phantom{xxxxx}|$$
$$\phantom{xx}CF_3\phantom{xxx}CF_3$$

where, n is an integer.

5. A magnetic disk as claimed in claim 4, wherein said protective film is a carbon film.

6. A magnetic disk apparatus comprising
a magnetic disk composed of a substrate on which is stacked in sequence a surface preparing film, a magnetic film, a protective film, and a lubricating film, said magnetic disk being connected to a rotation driving mechanism,
a magnetic head for recording and regenerating information at said magnetic disk,
a head slider mounting said magnetic head, and
a head access mechanism, wherein
said lubricating film contains at least two lubricating layers, of different materials, that include respectively at least two different lubricating agents, which lubricating layers are laminated,
a most exterior lubricating layer of said lubricating film includes a perfluoropolyether group compound expressed by the following general formula (IV):

$$\text{(IV)}\quad \text{[benzodioxole]}-CH_2-O-CH_2-CF_2O-(CF_2CF_2O)m-(CF_2O)n-CF_2-CH_2O-CH_2-\text{[benzodioxole]}$$

where, m, n are integers, and
a most interior lubricating layer of said lubricating film includes at least one of two kinds of perfluoropolyether group compounds expressed by the following general formulas (V), (VI):

$$F-(CF_2CF_2CF_2O)n'-C_2F_4-COO-NH_3^+-\langle\bigcirc\rangle-O-\langle\bigcirc\rangle \quad \text{(VI)}$$

$$F-(CFCF_2O)n'CF-COO-NH_3^+-\langle\bigcirc\rangle-O-\langle\bigcirc\rangle \quad \text{(V)}$$
$$\phantom{xx}|\phantom{xxxxx}|$$
$$\phantom{xx}CF_3\phantom{xxx}CF_3$$

where, n' is an integer,
the maximum static friction coefficient generated between the magnetic disk and the head slider at starting up of the magnetic disk apparatus is at most 2.0, and
a dynamic friction coefficient generated between the magnetic disk and the head slider during rotation of the magnetic disk is at most 1.0.

7. A magnetic disk apparatus as claimed in claim 6, wherein said protective film is a carbon film.

8. A magnetic disk apparatus comprising:
a magnetic disk including a substrate on which is stacked in sequence a surface preparing film, a magnetic film, a protective film, and a lubricating film, said magnetic disk being connected to a rotation driving mechanism,
a magnetic head for writing and reading information at said magnetic disk,
a head slider mounting said magnetic head, and
a head access mechanism, wherein
said lubricating film contains at least two lubricating layers, of different materials, that include at least two different lubricating agents forming said at least two lubricating layers, a most exterior lubricating layer of said lubricating film comprises a perfluoropolyether group compound expressed by the following general formula (IV):

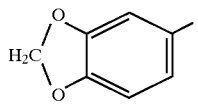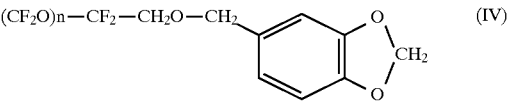 (IV)

where, m, n are integers, and a most interior lubricating layer of said lubricating film comprises of at least one of two kinds of perfluoropolyether group compounds expressed by the following general formulas (VII), (VIII):

$$F-(CF_2CF_2CF_2O)n'-C_2F_4-CONH-C_3H_6-Si-(OC_2H_5)_3 \quad (VII)$$

$$F-(CFCF_2O)n'-CF-CONH-C_3H_6-Si-(OC_2H_5)_3 \quad (VIII)$$
$$\qquad\quad |\qquad\quad\; |$$
$$\qquad\;\, CF_3\qquad\, CF_3$$

where, n' is an integer, a maximum static friction coefficient generated between the magnetic disk and the head slider at starting up of the magnetic disk apparatus is at most 2.0, and a dynamic friction coefficient generated between the magnetic disk and the head slider during rotation of the magnetic disk is at most 1.0.

9. A magnetic disk apparatus as claimed in claim 8, wherein said protective film is a carbon film.

10. A magnetic disk apparatus comprising a magnetic disk composed of a substrate on which is stacked in sequence a surface preparing film, a magnetic film, a protective film, and a lubricating film, said magnetic disk being connected to a rotation driving mechanism, a magnetic head for writing and reading information at said magnetic disk, a head slider mounting said magnetic head, and a head access mechanism, wherein said lubricating film contains at least two lubricating layers, of different materials, that include at least two different lubricating agents in the at least two lubricating layers, which lubricating layers are laminated, a most exterior lubricating layer of said lubricating film comprises a perfluoropolyether group compound expressed by the following general formula (IX):

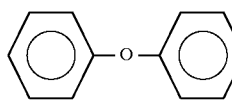—O—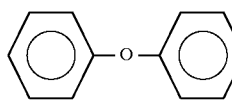—H$_3$N$^+$O$^-$CO—(CF$_2$CF$_2$O)m—(CF$_2$O)n—COO$^-$NH$_3^+$—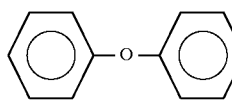—O—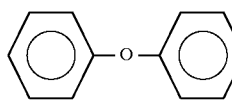 (IX)

where, m, n are integers, and a most interior lubricating layer of said lubricating film comprises at least one of two kinds of perfluoropolyether group compounds expressed by the following general formulas (VII), (VIII):

$$F-(CF_2CF_2CF_2O)n'-C_2F_4-CONH-C_3H_6-Si-(OC_2H_5)_3 \quad (VII)$$

$$F-(CFCF_2O)n'-CF-CONH-C_3H_6-Si-(OC_2H_5)_3 \quad (VIII)$$
$$\qquad\quad |\qquad\quad\; |$$
$$\qquad\;\, CF_3\qquad\, CF_3$$

where, n' is an integer, a maximum static friction coefficient generated between the magnetic disk and the head slider at starting up of the magnetic disk apparatus is at most 2.0, and a dynamic friction coefficient generated between the magnetic disk and the head slider during rotation of the magnetic disk is at most 1.0.

11. A magnetic disk apparatus as claimed in claim 10, wherein said protective film is a carbon film.

12. A magnetic disk apparatus comprising a magnetic disk comprising a substrate on which is stacked in sequence a surface preparing film, a magnetic film, a protective film, and a lubricating film, said magnetic disk being connected to a rotation driving mechanism, a magnetic head for writing and reading information at said magnetic disk, a head slider mounting said magnetic head, and a head access mechanism, wherein said lubricating film contains at least two lubricating layers, of different materials, that include respectively at least two different lubricating agents, which lubricating layers are laminated, a most exterior lubricating layer of said lubricating film comprises at least one of two kinds of perfluoropolyether group compounds expressed by the following general formulas (X), (XI):

$$HO-CH_2-(CF_2CF_2O)m-(CF_2O)n-CH_2-OH \quad (X)$$

$$HO-(CH_2CH_2O)p-CH_2-CF_2(CF_2CF_2O)m-(CF_2O)n-O-$$

$$CF_2-CH_2-(OCH_2CH_2)q-OH \quad (XI)$$

where, m, n, p, q are integers, and a most interior lubricating layer of said lubricating film comprises at least one of two kinds of perfluoropolyether group compounds expressed by the following general formulas (V), (VI):

$$F-(CF_2CF_2CF_2O)n-C_2F_4-COO^-NH_3^+-\langle\bigcirc\rangle-O-\langle\bigcirc\rangle \quad (V)$$

$$F-(CFCF_2O)n-CF-COO^-NH_3^+-\langle\bigcirc\rangle-O-\langle\bigcirc\rangle \quad (VI)$$
$$\phantom{F-(CFCF_2O)n-}|\phantom{-CF-}|$$
$$\phantom{F-(CFCF_2O)n-}CF_3\phantom{-}CF_3$$

where, n' is an integer, a maximum static friction coefficient generated between the magnetic disk and the head slider at starting up of the magnetic disk apparatus is at most 2.0, and a dynamic friction coefficient generated between the magnetic disk and the head slider during rotation of the magnetic disk is at most 1.0.

13. A magnetic disk apparatus as claimed in claim 12, wherein said protective film is a carbon film.

14. A magnetic disk apparatus comprising a magnetic disk comprising a substrate on which is provided in sequence a surface preparing film, a magnetic film, a protective film, and a lubricating film, said magnetic disk being connected to a rotation driving mechanism, a magnetic head for writing and reading information at said magnetic disk, a head slider mounting said magnetic head, and a head access mechanism, wherein said lubricating film contains at least two lubricating layers, of different materials, that include respectively at least two different lubricating agents, which lubricating layers are laminated, a most exterior lubricating layer of said lubricating film comprises at least one of two kinds of perfluoropolyether group compounds expressed by the following general formulas (X), (XI):

$$HO-CH_2-(CF_2CF_2O)m-(CF_2O)n-CH_2-OH \quad (X)$$

$$HO-(CH_2CH_2O)p-CH_2-CF_2-(CF_2CF_2O)m-(CF_2O)n-O-CF_2-CH_2-(OCH_2CH_2)q-OH \quad (XI)$$

where, m, n, p, q, are integers, and a most interior lubricating layer of said lubricating film is composed of at least one of two kinds of perfluoropolyether group compounds expressed by the following general formulas (VII), (VIII):

$$F-(CF_2CF_2CF_2O)n'-C_2F_4-CONH-C_3H_6-Si-(OC_2H_5)_3 \quad (VII)$$

$$F-(CFCF_2O)n'-CF-CONH-C_3H_6-Si-(OC_2H_5)_3 \quad (VIII)$$
$$\phantom{F-(CFCF_2O)n'-}|\phantom{-CF-}|$$
$$\phantom{F-(CFCF_2O)n'-}CF_3\phantom{-}CF_3$$

where, n' is an integer, a maximum static friction coefficient generated between the magnetic disk and the head slider at starting up of the magnetic disk apparatus is at most 2.0, and a dynamic friction coefficient generated between the magnetic disk and the head slider during rotation of the magnetic disk is at most 1.0.

15. A magnetic disk apparatus as claimed in claim 14, wherein said protective film is a carbon film.

16. A magnetic disk having a non-magnetic substrate on which a magnetic medium is formed, and a protective layer is formed on said magnetic medium, wherein an adhesion enhancing layer is formed on said protective layer, a fluorine compound is formed on said adhesion enhancing layer, said fluorine compound being a compound that combines with said adhesion enhancing layer by forming a salt or a complex body, said salt or said complex body adsorbs heat generated by sliding with a magnetic head so as to form said fluorine compound from said salt or said complex body, and said fluorine compound recombines with the adhesion enhancing layer by releasing the heat to form the salt or the complex body.

17. A magnetic disk as claimed in claim 16, wherein said fluorine compound is formed in a different layer than the adhesion enhancing layer, on the adhesion enhancing layer.

18. A magnetic disk comprising a non-magnetic substrate on which a magnetic medium is formed, and a protective layer is formed on said magnetic medium, wherein an adhesion enhancing layer is formed on said protective layer, said adhesion enhancing layer is a film which is capable of forming carboxylic acid salt or a complex body with carboxylic acid terminated fluorine containing group alkyl chain or polyoxyalkyl chain, and of repeating adsorption and desorption reversely with carboxylic acid terminated fluorine containing group alkyl chain or polyoxyalkyl chain by a thermal reaction, and a layer of a compound containing a carboxylic acid terminated fluorine containing group alkyl chain or polyoxyalkyl chain, laminated on said adhesion enhancing layer.

19. A magnetic disk as claimed in claim 18, wherein said adhesion enhancing layer is made of a non-magnetic metal or oxide thereof.

20. A magnetic disk comprising a non-magnetic substrate on which a magnetic medium is formed, and a protective layer is formed on said magnetic medium, wherein an adhesion enhancing layer is formed on said protective layer so that amino groups are oriented toward an exterior of the adhesion enhancing layer, and a carboxylic acid terminated fluorine containing group alkyl chain or polyoxyalkyl chain, which is capable of repeating adsorption and desorption reversely with said adhesion enhancing layer by a thermal reaction, is formed on said adhesion enhancing layer.

21. A magnetic disk as claimed in claim 20, wherein a fluorine atom combined to a primary carbon atom adjacent to a carboxylic group of said carboxylic acid terminated fluorine containing group alkyl chain or polyoxyalkyl chain which is combined to the adhesion enhancing layer has a nuclear magnetic resonance spectrum which is shifted toward a low magnetic field direction by 2.0 ppm at room temperature and 1.0 ppm at 150° C. in comparison with a chemical shift in a non-bonding state.

22. A magnetic disk as claimed in any one of claims 18, 20, 21, wherein said adhesion enhancing layer has a structure expressed by the following general formula;

$$A-R-X$$

where, A is an aromatic amine, or an amine-containing heterocyclic compound, X is a functional group having reactivity with the protective layer, and R is a bonding group for bonding the aromatic amine A and the functional group X.

23. A magnetic disk as claimed in claim 20, wherein said adhesion enhancing layer is composed of one of cyclic azoannulene derivatives.

24. A magnetic disk as claimed in claim 18, or 20, wherein said carboxylic acid terminated fluorine containing group alkyl chain has a structure expressed by the following general formula (XII);

$$-(CF_2)_k-\quad\text{(XII)}$$

where, k is an integer from 1 to 12.

25. A magnetic disk as claimed in claim 24, wherein said adhesion enhancing layer has a structure expressed by the following general formula;

$$A-R-X$$

where, A is an aromatic amine, or an amine-containing heterocyclic compound, X is a functional group having reactivity with the protective layer, and R is a bonding group for bonding the aromatic amine A and the functional group X.

26. A magnetic disk as claimed in claim 18 or 20, wherein said carboxylic acid terminated fluorine containing group alkyl chain is a polyoxyalkylene chain alone, or a fluorine terminated mixed group having a structure expressed by any of the following general formulas (XIII)–(XV);

$$-(CF_2)_k-\quad\text{(XIII)}$$
$$-(CF_2-O)_k-\quad\text{(XIV)}$$
$$-(C_2F_4-O)_k-\quad\text{(XV)}$$

where, k is an integer from 5 to 60, and may be different from each other depending on respective structure.

27. A magnetic disk as claimed in claim 26, wherein said adhesion enhancing layer has a structure expressed by the following general formula;

$$A-R-X$$

where, A is an aromatic amine, or an amine-containing heterocyclic compound, X is a functional group having reactivity with the protective layer, and R is a bonding group for bonding the aromatic amine A and the functional group X.

28. A magnetic disk as claimed in claim 20, wherein said carboxylic acid terminated fluorine is formed as a layer on the adhesion enhancing layer.

29. A magnetic disk apparatus comprising:

a magnetic disk comprising a substrate on which is stacked in sequence a surface preparing film, a magnetic film, a protective film, and a lubricating film, said magnetic disk being connected to a rotation driving mechanism, a magnetic head for writing and reading information at said magnetic disk, a head slider mounting said magnetic head, and a head access mechanism, wherein an adhesion enhancing layer is formed on said protective layer, a fluorine compound is formed on said adhesion enhancing layer, said fluorine compound being a compound that combines with said adhesion enhancing layer by forming a salt or a complex body, said salt or said complex body absorbs heat generated by sliding with a magnetic head so as to form said fluorine compound from said salt or said complex body, and said fluorine compound recombines with the adhesion enhancing layer by releasing the heat to form the salt or the complex body.

30. A magnetic disk apparatus as claimed in claim 29, wherein:

said adhesion enhancing layer has a structure expressed by the following general formula;

$$A-R-X$$

where, A is an aromatic amine, or an amine-containing heterocyclic compound, X is a functional group having reactivity with the protective layer, and R is a bonding group for bonding the aromatic amine A and the functional group X.

31. A magnetic disk apparatus as claimed in claim 29, wherein said fluorine compound is formed in a different layer than the adhesion enhancing layer, on the adhesion enhancing layer.

32. A method for forming a magnetic disk having a non-magnetic substrate on which a magnetic medium is formed, and a protective layer is formed on said magnetic medium, comprising the steps of:

forming an adhesion enhancing layer on said protective layer; and after forming the adhesion enhancing layer, forming a fluorine compound on said adhesion enhancing layer, said fluorine compound being a compound that combines with said adhesion enhancing layer by forming a salt or a complex body, said salt or said complex body adsorbing heat generated by sliding with a magnetic head so as to form said fluorine compound from said salt or said complex body, and said fluorine compound recombining with the adhesion enhancing layer by releasing the heat to form the salt or the complex body.

33. The method as claimed in claim 32, wherein said fluorine compound is a carboxylic acid terminated fluorine compound containing group alkyl chain or polyoxyalkyl chain, and said adhesion enhancing layer is formed so that amino groups of said adhesion enhancing layer are oriented toward the fluorine compound.

34. Product formed by the method of claim 33.

35. Product formed by the method of claim 32.

* * * * *